United States Patent [19]

Lee et al.

[11] Patent Number: 5,588,073
[45] Date of Patent: Dec. 24, 1996

[54] ONLINE HANDWRITTEN CHARACTER RECOGNIZING SYSTEM AND METHOD THEREOF

[75] Inventors: Heun J. Lee, Seoul; Moon J. Joe, Kyoungki-do, both of Rep. of Korea

[73] Assignee: Goldstar Co., Ltd., Seoul, Rep. of Korea

[21] Appl. No.: 550,227

[22] Filed: Oct. 30, 1995

Related U.S. Application Data

[63] Continuation of Ser. No. 309,569, Sep. 20, 1994, abandoned, which is a continuation of Ser. No. 971,649, Nov. 5, 1992, abandoned.

[30] Foreign Application Priority Data

Feb. 14, 1992 [KR] Rep. of Korea ................. 1992-2214

[51] Int. Cl.$^6$ ................................................ G06K 9/00
[52] U.S. Cl. ................................ 382/187; 382/158
[58] Field of Search .................................. 382/181, 185, 382/186, 187, 156, 159, 155, 280

[56] References Cited

U.S. PATENT DOCUMENTS 4,680,804  7/1987  Kuzunuki et al. ................. 382/13
4,685,142  8/1987  Ooi et al. ............................ 382/13
4,764,973  8/1988  O'Hair ................................ 382/15
4,901,358  2/1990  Bechet .............................. 382/13
5,107,442  4/1992  Weideman ......................... 382/15
5,150,424  9/1992  Aguro et al. ...................... 382/13
5,220,640  6/1993  Frank ................................. 395/2

Primary Examiner—Joseph Mancuso
Assistant Examiner—Gerard Del Rosso
Attorney, Agent, or Firm—Spencer & Frank

[57] ABSTRACT

An online handwritten character recognizing system and method thereof, is provided which includes a feature extracting section for providing a Fourier transformation of the coordinate points of the character strokes that have been inputted through a tablet input/output section and normalized for distance and time by a preprocessing section. The Fourier coefficient is provided by converting a coordinate function expressing the time between inputted points into a frequency function. The recognizing system also includes a character recognizing section for dividing the Fourier coefficient provided by the feature extracting section into an imaginary part and a real part and multiplying a weight to the imaginary part and the real part and thereafter recognizing this as a character by utilizing perceptron, so that complicated Hangul (Korean alphabet) and English characters can be rapidly and precisely recognized.

9 Claims, 4 Drawing Sheets

ONLINE HANDWRITTEN CHARACTER RECOGNIZING SYSTEM AND METHOD THEREOF

This is a continuation of application Ser. No. 08/309,569, filed on 20 Sep. 1994, now abandoned which is a continuation of application Ser. No. 07/971,649, filed on Nov. 5, 1992, now abandoned.

BACKGROUND OF THE INVENTION

1. Technical Field

The present invention relates generally to character recognition for recognizing a cursive style of Hangul (Korean alphabet) letters and English letters by a pen computer, a handwritten character input electronic pocket book, or a handwritten character input document editor and the like, and more particularly to an online handwritten character recognizing system and method thereof for effectively recognizing strokes of complicated characters such as the cursive style of Hangul or English even when character strokes are inputted via a personal writing style, by utilizing Fourier transformation and a neural network arrangement.

2. Background Art

Generally, automatic character recognizing systems utilizing Fourier transformation recognize a handwritten character inputted through an input means, such as a tablet, with a series of X and Y coordinates produced while writing the strokes of the character. The series of X coordinates and Y coordinates are then Fourier transformed, whereby Fourier coefficients are produced. The Fourier coefficients obtained from above-described calculation is compared with Fourier coefficients of standard characters that have been previously determined and stored in a memory storage. The standard character that is the most similar to the handwritten character is then recognized.

The conventional online handwritten character recognizing system utilizing Fourier transformation typically comprises, as shown in the accompanying FIG. 1, a preprocessing section 2 for filtering out any points that may be present at a distance away from the X coordinates and Y coordinates of the main points of a character stroke input through a tablet input/output section 1. The preprocessing section 2 is also used for normalizing the change of magnitude and time difference (speed) of writing the input points to a predetermined magnitude and distance. The conventional character recognizing system also includes a feature extracting section 3 for providing Fourier coefficients of character strokes by Fourier transformation (through the preprocessing section 2) of the coordinate points having the predetermined magnitude of points and the predetermined number of points, and a character recognizing section 5 for comparing the Fourier coefficients of character strokes obtained from the feature extracting section 3 with Fourier coefficients of standard character strokes stored in a database of a standard input pattern section 4. The character recognizing section 5 is also used for recognizing a difference between the standard stroke and regions of the input strokes. Finally, the character recognizing system involves a recognition result section 6 for transmitting a result recognized by the character recognizing section 5 to the tablet input/output section 1.

According to the conventional online handwritten character recognizing system described above, when the points of the character are input through the tablet input/output section 1, the preprocessing section 2 filters out the points which are present at a predetermined distance from the other input points to normalize the magnitude of the remaining input points for recognizing the character, irrespective of any change in the magnitude of the input points.

A conventional method of comparing input data to standard character stokes uses the Bayesian Decision Rule. The Bayesian Decision Rule imposes black marks upon detecting dissimilarity between the standard strokes and the inputted strokes. The black marks are imposed in cases where a starting region of the input stroke differs from the standard strokes, in cases where more data than that corresponding to standard character strokes are present, in cases where less data relative to the standard character strokes are present, in cases where any differences with the standard strokes are present after comparison to the input strokes, and in cases where differences between regions of the strokes are present. Standard strokes which have the least black marks imposed after comparing the standard strokes with the inputted strokes are outputted as a recognized result.

Unfortunately, these handwritten character recognizing systems that use a conventional Fourier transformation have had shortcomings in that calculating time is considerably long because of the separation of X axis and Y axis coordinates when seeking the Fourier coefficients of English character strokes that are obtained from the feature extracting section. Recognition time becomes even longer due to the processing of obscurities that may appear which do not match any of the standard characters when comparing standard characters to the inputted character in the character recognizing section. Additional problems occur with persons having a particular writing style, for which use of character recognition devices is frustrating since conventional devices are not always able to recognize unconventional writing styles when using a standard character selection as a reference.

OBJECT AND SUMMARY OF THE INVENTION

Accordingly, it is an object of the present invention to provide an online handwritten character recognizing system and a method thereof, for eliminating mutually adjoined points and overlapped points among the points inputted to the tablet input/output section, normalizing the input points of a character to a predetermined magnitude by viewing an outline of the inputted character irrespective of the magnitude of the points, simultaneously seeking the number of inputting points regardless of writing speed by dividing entire strokes into a predetermined number of intervals, seeking Fourier coefficients by compress-converting the inputted points into one signal, dividing the Fourier coefficients into a real part and an imaginary part, and utilizing the Fourier transformation with a neural network to accurately recognize the cursive styles of complicated English and Hangul characters rapidly and without comparison to standard characters.

The object of the present invention is accomplished by a system comprising: a preprocessing section for filtering out any points that are present outside of the region of points of the character inputted through the tablet input/output section, and for normalizing the difference in change of magnitude and writing speed of the inputted points into a predetermined magnitude and number of points; a feature extracting section for performing a Fourier transformation of the coordinates of the predetermined number of points having a predetermined magnitude, and for seeking the Fourier coefficients of the character by converting the time function of the coordinates of the inputted points into a frequency function, and a character recognizing section for dividing the Fourier coefficients of the character provided by the feature extracting section into an imaginary part and a real part, multiplying a weight to the imaginary part and the real part, and thereafter recognizing this as a character.

BRIEF DESCRIPTION OF THE DRAWINGS

FIG. 5A–C are diagrams showing the processing of handwritten character data in accordance with the operation illustrated in FIG. 4, in which:

FIG. 5A illustrates handwritten character data inputted to the tablet input/output section of the present invention, FIG. 5B illustrates handwritten character data processed at the preprocessing section of the present invention, and FIG. 5C is a graph showing magnitudes by frequency being Fourier transformed at the feature extracting section of the present invention.

DETAILED DESCRIPTION OF THE INVENTION

Hereinafter, the present invention will be described in more detail with reference to the accompanying drawings.

Figure 1:
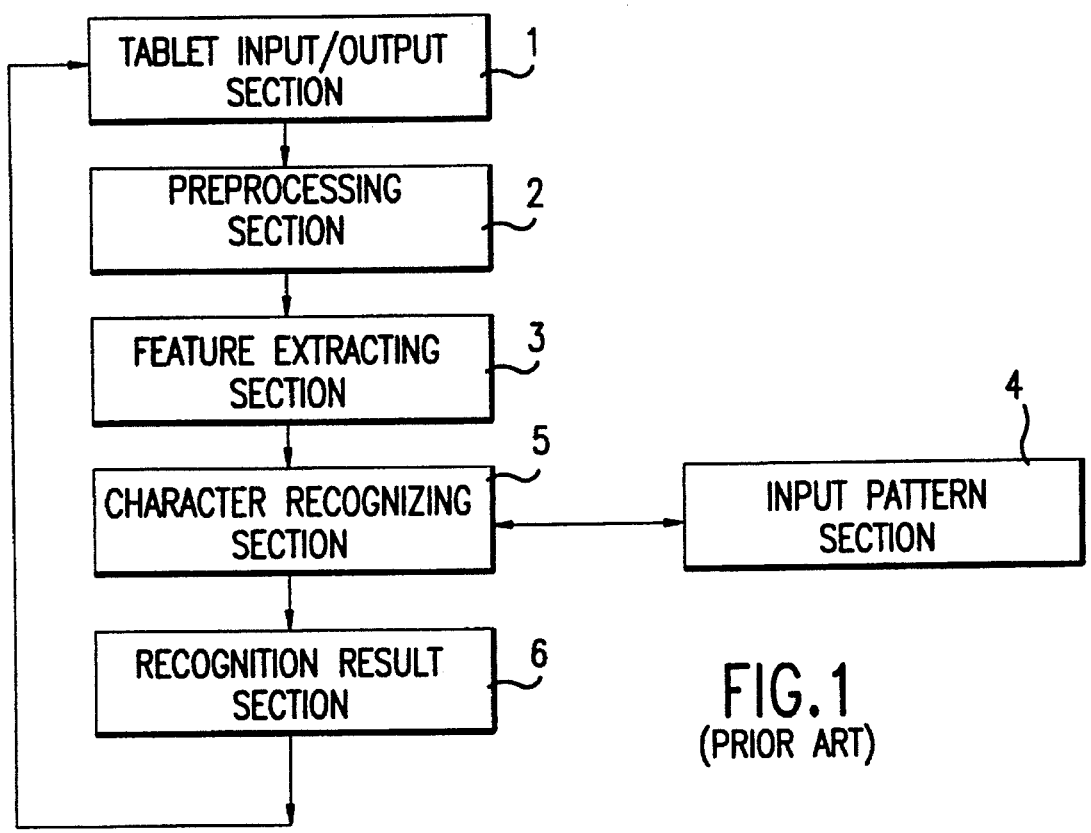
FIG. 1 is a block diagram of a conventional online handwritten character recognition system.
Figure 2:
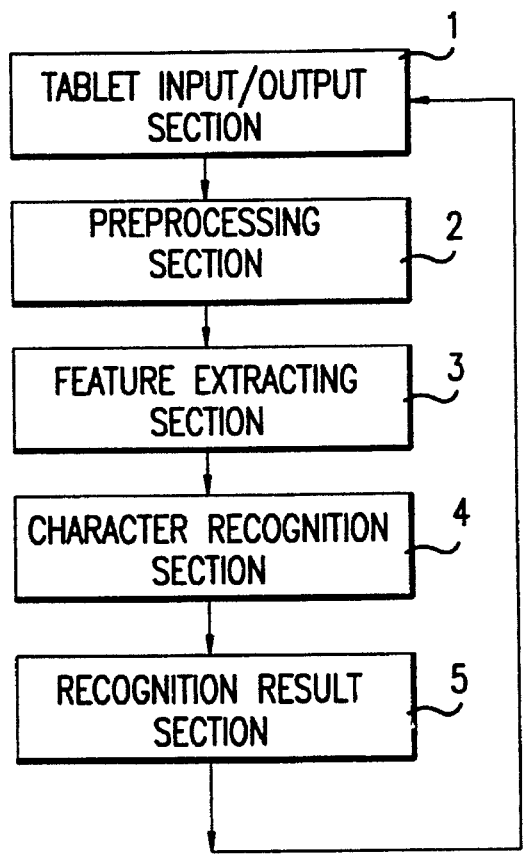
FIG. 2 is a block diagram of a preferred embodiment of an online handwritten character recognition system according to the present invention.
Figure 3:
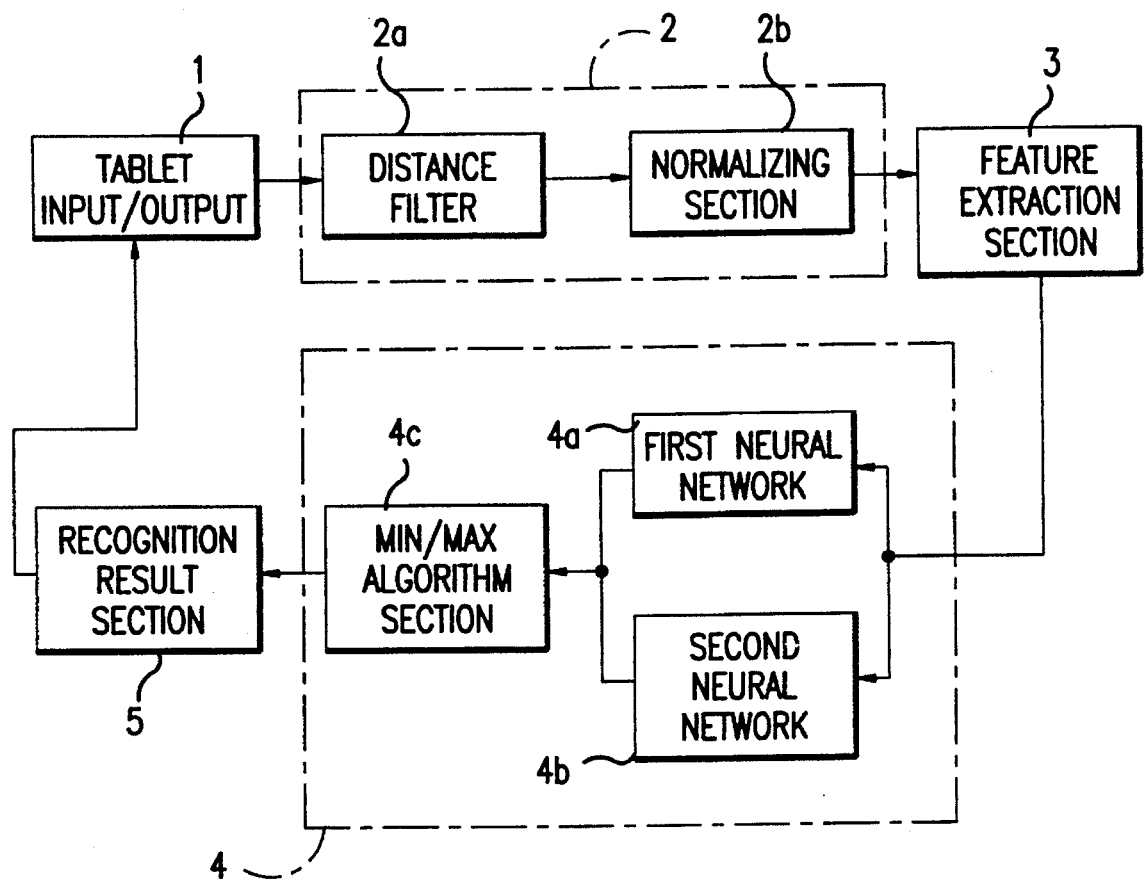
FIG. 3 is a detailed diagram of the online handwritten character recognition system shown in FIG. 2.

FIG. 2 is a block diagram of the online handwritten character recognition system of the present invention. FIG. 3 is a detailed diagram showing the subsections of a preprocessing section 2 and a character recognizing section 4, illustrated in block form in FIG. 2. Referring to FIGS. 2 and 3, the character recognition system of the present invention includes: a preprocessing section 2 having a distance filter 2a for eliminating the points of a character that are present at a distance away from the main points, and superposing points among the X coordinates and Y coordinate of the character strokes entered through the tablet input/output section 1, so as to obtain an outline of character strokes in order to convert the inputted points (through the distance filter 2a) into a predetermined magnitude regardless of the input magnitude of the character strokes.

Figure 5A:
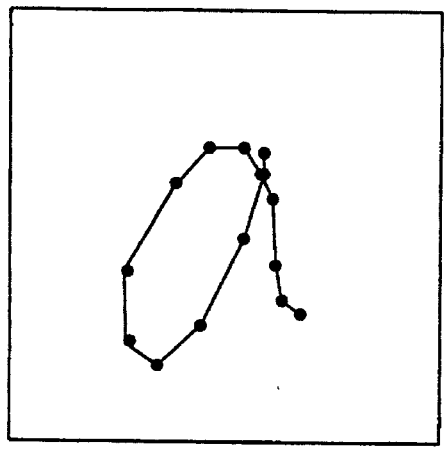

The inputted points are converted into sample points which are divided equally following the direction of the character strokes, in order to compensate for the difference in time required to write each stroke. The strokes are divided by a predetermined number of intervals and normalized through a normalizing section into a series of coordinate points having a predetermined distance apart and number irrespective of number of the inputted character points (compare the character "a" shown in FIGS. 5A & 5B).

The character recognition system of the present invention also includes a feature extracting section 3 for Fourier transformation of the coordinates having the normalized magnitude and predetermined number of points; a character recognition section 4 for dividing the Fourier coefficients of the character strokes into an imaginary part and a real part, and for recognizing the character by multiplying a weight stored in a database to the imaginary part and the real part of the Fourier coefficients; and a recognition result section 5 for outputting to the tablet input/output section 1 the result recognized from the character recognition section 4.

Figure 4:
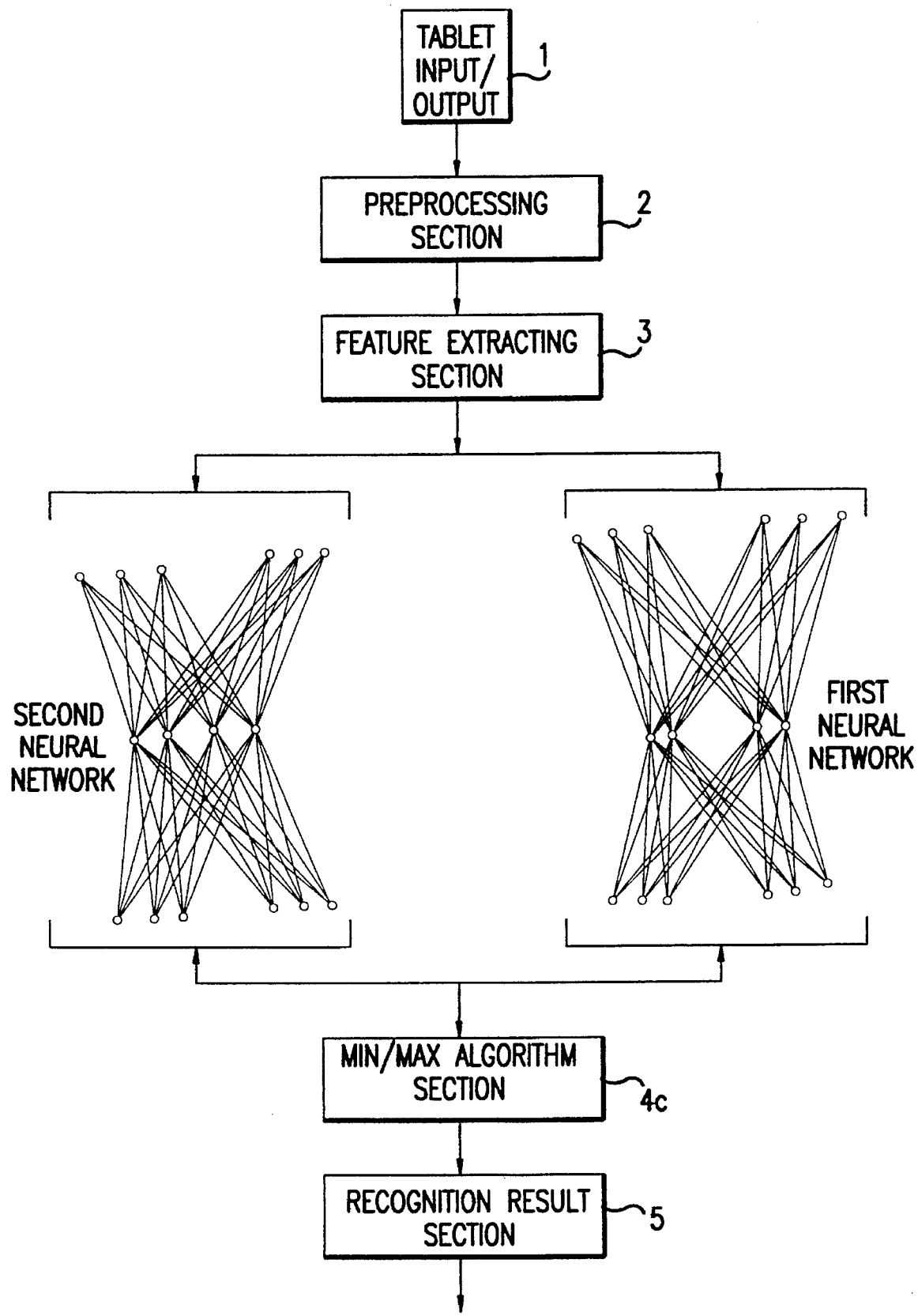
FIG. 4 is a diagram showing the operation of the present invention in accordance with FIG. 2.

Referring now to FIG. 4, the character recognizing section 4 further comprises a first neural network section 4a for multiplying a weight to the real number of the Fourier coefficients produced by the feature extracting section 3, and outputting its resultant signal; a second neural network section 4b for multiplying a weight to the imaginary number part of the Fourier coefficients produced by the feature extracting section 3, and outputting its resultant signal; and a Min/Max algorithm section 4c for selecting a smaller value from the outputted values of the first neural network section 4a and the second neural network section 4b, and for selecting a bigger value among the selected smaller values and then outputting it to the recognition result section 5.

The operation of the present invention will now be described with reference to FIG. 2 through FIG. 5.

Firstly, when the points of character are inputted through the tablet input/output section 1, the distance filter 2a of the preprocessing section 2 measures the distance between the points in order to eliminate the overlapping points and any superposed points that come from writing a character slowly. When eliminating the adjoined points and superposed points, for example, the X coordinates of K-th inputted point are expressed as X(K) and the Y coordinates as Y(K), with the distance filter 2a defined as follows:

$$\{X(K)-X(K-1)\}^2+\{Y(K)-Y(K-1)\}^2 \geq d \qquad \text{(Expression 1)}$$

Any points satisfying a condition of Expression I are received as input, and points not satisfying Expression I are eliminated. Herein, d is a critical value of the distance filter 2a, and may be preferably defined as d=1.

In order to recognize the inputted points filtered through the distance filter 2a irrespective of magnitude, they are normalized to a predetermined magnitude or interval distance by the normalizing section 2b. That is, since more points are inputted to the normalized section 2b in the case of a slowly written letter and less points are inputted in the case of quickly written letter, the normalizing section 2b normalizes the letter to a predetermined distance between input points in order to compensate for the writing difference.

The normalizing section 2b provides an outline of the character strokes in order to convert the inputted points into a predetermined magnitude regardless of the magnitude change in the inputting points. The normalizing section 2b follows the direction of all of the character strokes in order to convert each stroke by a predetermined rate, and simultaneously compensate for the difference in the time required to write each stroke of the character.

Figure 5B:
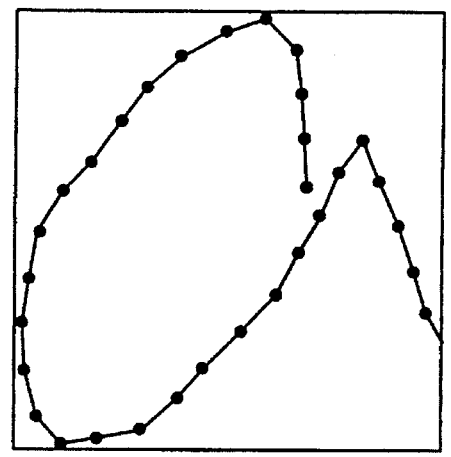

The normalizing section 2b samples the inputted points a predetermined number of times, dividing the strokes and thereafter converting them to a coordinate series having a predetermined distance between sampled points and a predetermined number of sampling points. (See FIGS. 5A & 5B) Thereafter, the inputting strokes are changed to the coordinate points having the predetermined magnitude and the predetermined sampling number, as illustrated in FIG. 5(B), and are inputted to the feature extracting section 3.

The feature extracting section 3 performs a Fourier transformation of the coordinate points inputted having the predetermined magnitude (or interval) and the predetermined number of points, as provided by the normalizing section 2b of the preprocessing section 2.

Figure 5C:
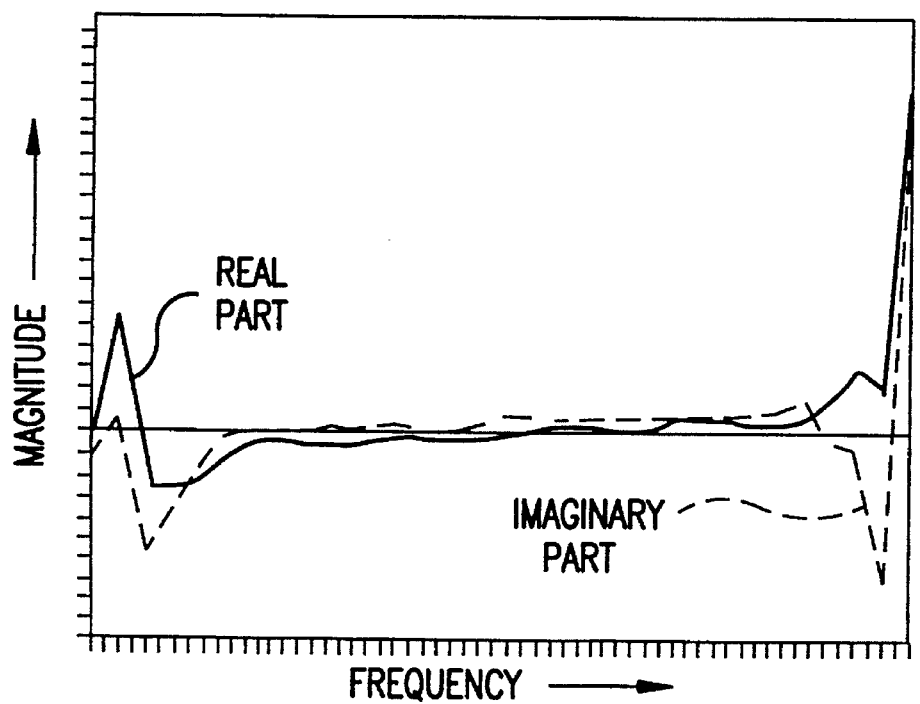

The feature extracting section 3 converts the coordinates, as a function based on the time interval of the inputted points, into a frequency function to thereby obtain the Fourier coefficients. When the coordinate series of sequential inputting points are Fourier transformed, the coordinate function based on the time interval of the inputted points is converted into the frequency function or domain, as shown in FIG. 5(C). Accordingly, the inputted points are expressed as Fourier coefficients representing the shape of the inputting strokes within the Fourier coefficients. For example, when the coordinates of the j-th inputting point are expressed as X(j) and Y(j), a signal Z(j) for the Fourier transformation is expressed as follows:

$$Z(j)=X(j)+i*Y(j) \quad \text{(Expression 2)},$$

wherein i is an imaginary number.

In the above-described Expression 2, compressed data may be obtained by taking a trajectory of the X axis of the stroke from the real number and taking a trajectory of the Y axis from the imaginary number and making one combined signal. When the trajectories of the X and Y axes are normalized between −1 and +1, the input signal becomes a unit circle, thereby providing an efficient Fourier transformation.

A discrete Fourier transformed input signal is expressed as follows.

$$C(k) = 1/N \sum_{j=0}^{N-1} Z(j)*\exp(-2\pi i*j*k/N); \quad \text{(Expression 3)}$$

wherein C(K) is the Fourier coefficient inputted to the character recognizing section 4.

The character recognizing section 4 recognizes the character inputted by utilizing the first neural network 4a and the second neural network 4b with the Fourier coefficients provided by the feature extracting section 3. Advantageously, when the first and second neural network sections 4a,4b are utilized, the writing style of an individual user may be obtained through a "learning" process. That is, the first and second neural network sections 4a,4b can be taught to recognize the letters written by different persons. After processing in the preprocessing section 2 and the feature extracting section 3, the characters written by different persons are inputted to the first and second neural network sections 4a, 4b where the characters are recognized in the neural network sections which were previously trained.

To achieve this operation, the first and second neural network sections 4a,4b have used a multiple layer perceptron (i.e., a neuron located in an intermediate layer of the neural network) having a single intermediate layer, in which an Activation Function of each neuron is a Sigmoid function having values between 0 and 1. The Activation Function for a neuron of a network involves transforming of the sum of all inputs to the neuron into an output according to a predetermined transformation. The present invention uses the standard Sigmoid Function for this transformation and as the Activation Function. Referring to the frequency characteristic of the characters as an inputting character object (see FIG. 5(C)), since only a low frequency component and a high frequency component are present and an intermediate frequency band component is almost or substantially absent, it need not be used as input data in order to reduce the calculating time and to raise the efficiency of the learning process.

As shown in FIG. 5(C), since the frequency component is almost absent between the 10-th to 20-th harmonics, it is not accepted or used as input data. Accordingly, the inputting character object contains values only from the 0th to the 9th harmonics and from the 21st to the 32nd harmonics. Thus, it has the input total of twenty two (22). The hidden layer can accommodate thirty (30) neurons when comparing the similarity between the character to be learned and each known character. Moreover, the neuron of the hidden layer can be made to be the same as the number of characters to be recognized.

The character recognizing section 4 may be separated into a process for first training to recognize the character's Fourier coefficients transmitted from the feature extracting section 3 to the first and second neural network sections 4a, 4b, and a process for subsequently recognizing the character inputted, by using the learned result.

In the training process, the characters written by many people are inputted to the first and second neural network sections 4a, 4b in form of Fourier coefficients. The Fourier coefficients extracted from the characters written by people are divided into imaginary number part and real number part and then stored in a memory as a database. The codes representing the characters corresponding to the Fourier coefficients are also stored in the memory. The real number part and imaginary number part of the Fourier coefficients are inputted to the first and second neural network section separately. That is, the first neural network section is trained by the real number part and the second neural network section is trained by the imaginary number part. The output of the neural network section is the code of the character corresponding to the Fourier coefficients. This training process for neural network section 4 is repeated for whole characters stored in the data base. After the training process, the neural network section 4 determines the rule for deciding its weight automatically.

Thereafter, whenever that character is written by that individual, the Fourier coefficient of that character provided by the feature extracting section 3 is divided into a real part and an imaginary part and inputted to the first and second neural network sections 4a, 4b, the first neural network section 4a multiplies the weight corresponding to that character and stored in the database in memory to the real part of the inputted Fourier coefficients, and outputs a real number value having a range from 0 to 1. The second neural network section 4b multiplies the weight stored in memory to the imaginary part of the presently inputted Fourier coefficients from the feature extracting section 3 and outputs a real number value having a range from 0 to 1. Here, the weight values multiplied to the first and second neural network sections 4a, 4b may be different from one another.

In the recognizing process, the Min/Max algorithm section 4c selects a smaller value from among the outputted real number value of the first neural network section 4a, and the real number value outputted from the second neural network section 4b. The Min/Max algorithm section 4c recognizes the character allocated to a neuron having the biggest real number value among the selected neuron real number values, and transmits the recognized result through the recognition result section 5 to the tablet input/output section 1. The tablet input/output section 1 may be an input/output integral type liquid crystal display.

As an example, assuming that the characters allocated to the neuron are the lower case letters "a" "b" "c" and "d"; the output value of the first neural network section 4a for the letter a is 0.5; the output value of the second neural network section 4b for the letter a is 0.6; the output values of the first and second neural network sections 4a, 4b for the letter b are 0.3 and 0.1; the output values of the first and second neural network sections 4a, 4b for the letter c are 0.7 and 0.4; and the output values of the first and second neural network sections 4a, 4b for the letter d are 0.1 and 0.2.

The Min/Max algorithm section 4c then selects a smaller value among the output values of the first and second neural network sections 4a, 4b, i.e., 0.5 for the letter a; 0.1 for the letter b; 0.4 for the letter c; and 0.1 for the letter d. The 0.5 value for the letter a is the biggest output value among the selected output values and is therefore recognized as a character "a" allocated to the neuron.

Expressing this example in a table format:

The character allocated to neuron—a b c d

The output of the first neural network section of the real part—0.5 0.3 0.7 0.1

The output of the second neural network section of the imaginary part 0.6 0.1 0.4 0.2 →"a" recognized.

Thus, the recognizing process is completed by transmitting the result recognized as the character or letter "a" through the recognition result section 5 to the table input/output section 1.

As described in detail above, the present invention does not convert characters by dividing their inputted X coordinates and Y coordinates in order to do a Fourier transformation of the inputted strokes at the feature extracting section 3, but rather provides for one signal so that not only a decrease in calculating time is achieved, but also a compressed form of data may be obtained. Moreover, by using the neural network 4a, 4b and the Min/Max algorithm 4c in the character recognizing section 4, not only is a recognition process possible without comparison to standard characters, but particular personal writing styles are recognized. Accordingly, the present invention can provide for the rapid and precise recognition of complicated strokes such as the cursive style of Hangul and English.

What is claimed is:

1. An online handwritten character recognizing system, comprising:

an input device inputting a character and outputting a character signal including character points of said character;

a preprocessor connected to said input device and receiving said character signal and converting said character points into sample points which have normalized magnitude and uniform sampling interval;

feature extracting means for receiving said sample points from said preprocessor and transforming a coordinate function made from said sample points into Fourier coefficients representing the character;

character recognition means for receiving said Fourier coefficients from said feature extracting means, and recognizing the inputted character from said Fourier coefficients, wherein said character recognition means including:

a first neural network for generating a plurality of first signals responsive to real part of said Fourier coefficients;

a second neural network for generating a plurality of second signals responsive to imaginary part of said Fourier coefficients; and MIN/MAX algorithm means for selecting a plurality of smaller values from the plurality of first and second signals, each smaller value being selected as the smaller of a corresponding pair of first and second signals, and selecting a largest value from the plurality of smaller values to recognize the inputted character.

2. An online handwritten character recognizing system as defined in claim 1, wherein said coordinate function is defined as the expression $Z(j)=X(j)+i*Y(j)$.

3. An online handwritten character recognizing system as defined in claim 1, wherein said plurality of signals of said first and second neural networks are real values between 0 and 1.

4. An online handwritten character recognizing system as defined claim 1, wherein said first and second neural networks are previously trained by various input patterns which are characters written by a plurality of different persons and transformed into Fourier coefficients and then stored in a memory as a database, said database including real parts and imaginary parts of said Fourier coefficients and codes which identify the written characters.

5. A method of recognizing handwritten characters using an online system comprising the steps of:

inputting a character by handwriting said character on an input device and outputting from the input device a character signal including coordinates of character points of said character;

in a preprocessor for receiving the character signal, normalizing a magnitude of the character signal and converting said character points into sample points having a uniform sampling interval;

in a feature extracting means connected to said preprocessor, generating a coordinate function with coordinates of said sample points provided by said preprocessor and transforming the coordinate function into Fourier coefficients representing said character;

in character recognition means connected to said feature extracting means, recognizing the inputted character from said Fourier coefficients by the following steps:

(a) generating in a first neural network a plurality of first signals responsive to real part of said Fourier coefficients;

(b) generating in a second neural network a plurality of second signals responsive to imaginary part of said Fourier coefficients; and (c) selecting in a MIN/MAX algorithm means a plurality of smaller values from the plurality of first and second signals, each smaller value being selected as the smaller of a corresponding pair of first and second signals, and then selecting a largest value from the plurality of smaller values to recognize the inputted character.

6. The method of claim 5 further comprising providing said first and second neural networks with various input patterns of each character as written persons having different handwriting styles and which are transformed into Fourier coefficients and then stored in a memory as a database; and also providing said database with real parts and imaginary parts of said Fourier coefficients, and codes responsive to the written characters.

7. The method of claim 5 wherein said coordinate function is defined as the expression $z(j)=X(j)*i\ Y(j)$.

8. The method of claim 5 wherein said plurality of signals of said first and second neural networks are real values between 0 and 1.

9. An online handwritten character recognizing system comprising:

means including a tablet for inputting a character by handwriting and outputting a character signal as coordinates of points of the character;

means for eliminating mutually adjoined points and overlapped points among the points of the character inputted to the tablet means;

means for normalizing a magnitude of the handwritten character using the character signal outputted by said tablet and generating sample points having a uniform sampling interval;

means for generating a coordinate function with coordinates of said sample points and transforming the coordinate function into Fourier coefficients representing the character; and means for recognizing the character by the Fourier coefficients, which recognizing means comprises:
  (a) a first neural network means for recognizing the character by a real number part of the Fourier coefficients;
  (b) a second neural network means for recognizing the character by a imaginary number part of the Fourier coefficients; and
  (c) means for selecting in a MIN/MAX algorithm means a plurality of smaller values from the plurality of first and second signals, each smaller value being selected as the smaller of a corresponding pair of first and second signals, and then selecting a largest value from the plurality of smaller values to recognize the inputted character.

* * * * *